No. 863,746.
PATENTED AUG. 20, 1907.
E. D. NELSON & W. L. BROWN.
AIR BRAKE APPARATUS.
APPLICATION FILED MAY 21, 1907.
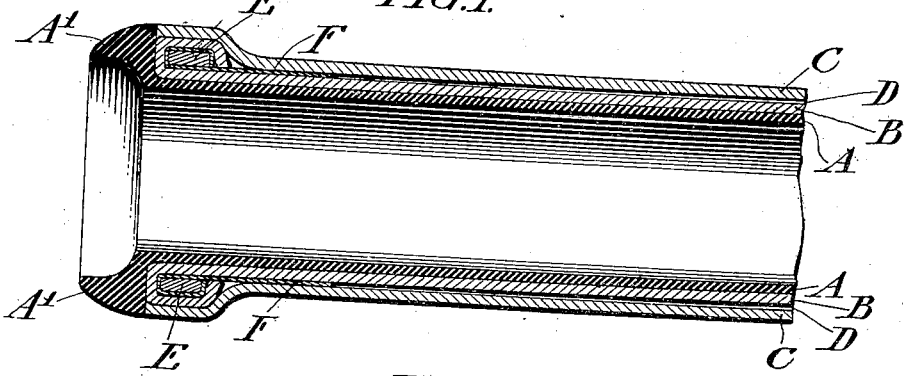
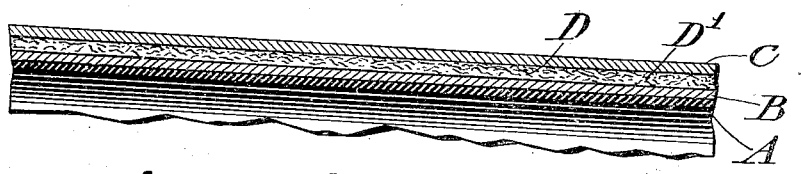
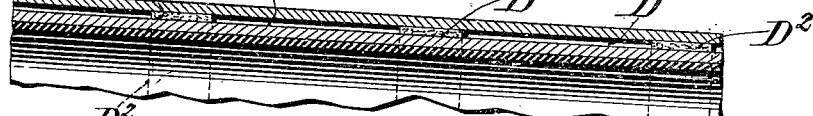
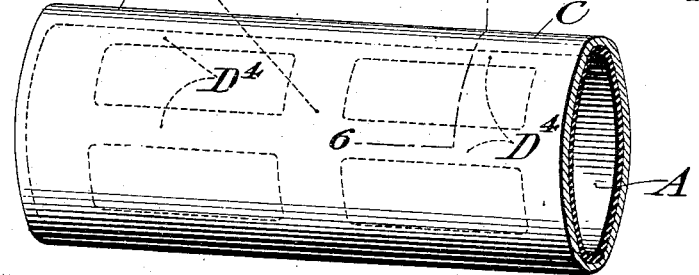
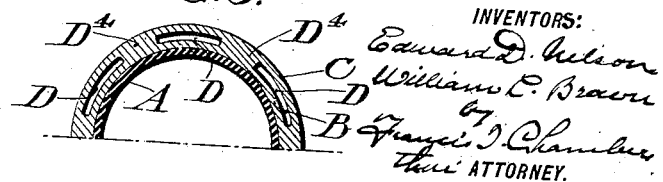
WITNESSES:
INVENTORS:
Edward D. Nelson
William L. Brown
by Francis J. Chambers
their ATTORNEY.

UNITED STATES PATENT OFFICE.

EDWARD D. NELSON AND WILLIAM L. BROWN, OF ALTOONA, PENNSYLVANIA.

AIR-BRAKE APPARATUS.

No. 863,746.        Specification of Letters Patent.        Patented Aug. 20, 1907.

Application filed May 21, 1907. Serial No. 374,859.

*To all whom it may concern:*

Be it known that we, EDWARD D. NELSON and WILLIAM L. BROWN, both citizens of the United States of America, and both residing in Altoona, in the county of Blair and State of Pennsylvania, have invented a certain new and useful Improvement in Air-Brake Apparatus, of which the following is a true and exact description, reference being had to the accompanying drawings, which form a part thereof.

Our present invention relates to a special construction of hose designed for the train pipe and like connections of air brake systems.

The object of our invention is the production of hose for the purpose specified possessing the flexibility and durability required and which is so constructed that upon such a rupture of the hose body proper as is apt to occur with the air pressure employed after the hose deteriorates, as from long continued usage, the hose will not become entirely inoperative, but on the contrary will so limit the escape of air that the rupture will not cause an emergency application of the brakes.

In carrying out our invention, we surround the hose body proper which may be of the usual cemented and vulcanized rubber and fabric construction, with a fabric cover or jacket permeable in a limited degree to air through the interstices of the fabric. This cover or jacket serves normally as a wearing tube or cover to protect the hose proper from injury by external agencies, as from wear, the weather, or flying cinders, which are very injurious on account of the sulfur contained in them. It is constructed, and arranged, however, so that upon a rupture of the hose body the escaping air may spread out laterally between the hose body and the jacket, but will be impeded in flowing through the interstices of the fabric cover to such an extent that the rupture will not result in an emergency application of the brakes. By preventing the emergency application of the brakes upon such rupture, we avoid a fruitful source of serious troubles, particularly with freight trains, due to the trains breaking apart on the emergency application of the brakes. The reduced leakage with our invention may result in a service application or merely in such leakage as to indicate the trouble by the slow loss of air. In either event the damage due to accidental emergency applications is avoided.

By providing for the lateral flow of air between the hose body and jacket, we avoid the liability of a rupture extending progressively through the entire wall of the hose structure which would be apt to occur if the cover formed in effect merely an outer layer of a single tube structure.

In carrying out our invention, we may loosely surround the entire hose body by a simple woven or braided jacket, but in this case we find it difficult to procure a jacket of such texture as to sufficiently impede the leakage through it which takes place along the entire length of the hose upon a rupture occurring anywhere in the hose body. We may reduce this leakage by placing a layer of felt or the like between the hose body and the cover jacket proper. Preferably, however, we provide means for limiting the lateral flow between the hose and cover of escaping air and thereby limit the area of the cover through which the leakage takes place. We accomplish this by use of walls which divide the space between the hose body and the cover into cells.

While the hose body and cover must be partially separated to allow for the necessary lateral flow of air, the ribs or walls between the cells in the form of our invention last mentioned may serve in some cases to integrally connect the hose body and the cover.

The various features of novelty, which characterize our invention, are pointed out with particularity in the claims annexed to and forming a part of this specification. For a better understanding of our invention, however, and the advantages possessed by it, reference may be had to the accompanying drawings and descriptive matter in which I have illustrated and described forms in which my invention may be embodied.

Of the drawings, Figure 1 is a sectional elevation of a portion of one form of a coupling hose. Fig. 2 is a partial sectional elevation of a portion of a second form of hose. Figs. 3 and 4 are views similar to Fig. 2, each showing a different modification. Fig. 5 is a perspective view of a portion of hose embodying a fifth form of our invention and Fig. 6 is a partial section taken on the line 6—6 of Fig. 5.

Referring first to the construction shown in Fig. 1, the inner hose body is made of a lining A of rubber and a surrounding tube B of rubber and fabric, and the whole being cemented and vulcanized together in the usual manner forming a hose of the usual construction. Surrounding the tube B and separated from it by a space D is a fabric cover or jacket C. In the form shown, the coupling end of the hose is enlarged and has embedded in it a metal ring E and the corresponding end of the rubber lining A is extended to form flaps $A^1$. This construction of a hose coupling end is also novel with us, but is not claimed herein as it forms the subject matter of and is claimed in our pending application Serial Number 302,014, filed the 20th day of February, 1906. A sheet F of canvas or the like is wrapped around the ring E and extends into the adjacent end of the space D forming a barrier to the flow of air out of the end of the space. The inner hose body formed of the jacket B and lining A forms in effect the hose proper which in normal operation is airtight and of sufficient strength to sustain the pressure employed. On a rupture of this hose body, such as may occur from the deterioration of the hose with long continued use, the escaping air passes into the space D and spreads laterally in the space between the inner surfaces of the jacket C and the outer surface of the jacket D, thereby avoiding local disruptive strains tending to burst the cover immediately adjacent the break in the hose body. A restricted flow of the air escaping into the space D takes place through the interstices of the jacket C. This relieves, to some extent the pressure on the inner wall of the jacket C and serves, either by the mere loss of air or by a service application of the brakes, to indicate to the trainmen that the hose is out of order. The jacket C is so constructed, however, that the air cannot escape through it fast enough to cause an emergency application of the brakes on a rupture of the inner hose body.

With the construction shown in Fig. 1 it is necessary to have the hose C formed of carefully constructed and selected material in order to obtain the proper degree of permeability. By limiting the flow of air in the space D upon the occurrence of a rupture at any one spot, we may diminish the area of the jacket C through which leakage takes place and thereby avoid the necessity for having the tube C formed of as tightly woven or braided material as would otherwise be necessary.

In Fig. 2 we have provided for limiting the flow of the air in the space D by filling it with a layer $D^1$ of felt or the like. This felt, of course tends to limit the flow of the escaping air into the atmosphere to some extent but is principally effective in cutting down the flow of air in the space D along the length and around the inner hose body. A preferable way of confining the portion of the space D into which air may flow upon a rupture of any tube is illustrated in Fig. 3, where the space D is divided up into short annular portions or cells by collars $D^2$ which may be of rubber or other material impervious to air, or of felt, or closely woven or braided fabric slightly permeable to air and surround the inner hose body along its length and extend between its outer surface and the inner surface of the cover C.

In Fig. 4 we have shown a construction in which the rings $D^3$ are woven or braided integrally with tubes B and C. In this case, of course, after the rubber lining has been vulcanized in place, the whole hose forms practically one integral structure but between each adjacent pair of rings $D^3$ are provided cells or spaces D into which the air may flow laterally on a break in an adjacent portion of the inner portion of the hose.

In the construction shown in Figs. 5 and 6, the space D is subdivided not only by the collars $D^3$, but also by axially extending ribs $D^4$.

Having now described our invention, what we claim as new and desire to secure by Letters Patent is,

1. In an air brake system, a flexible train pipe connecting hose having an inner body portion normally airtight and an outer fabric portion permeable to air in a limited degree through the interstices of the fabric, the inner and outer portions being separated by a space or spaces into which the air escaping from the inner portion on a rupture thereof may spread laterally, thereby reducing the local disruptive strains on the outer portion, the permeability of the outer portion being so limited that the leakage through it on a rupture of the inner hose body will be insufficient to cause an emergency application of the brakes.

2. In an air brake system, a flexible train pipe connecting hose having an inner body portion normally airtight, an outer fabric portion permeable to air in a limited degree through the interstices of the fabric, the inner and outer portions being separated by a space into which the air escaping through the inner portion on a rupture thereof may spread laterally, thereby reducing the local disruptive strains on the outer portion, and means for limiting the lateral flow of air in said space, the permeability of the outer portion being so limited that the leakage through it on a rupture of the inner hose body will be insufficient to cause an emergency application of the brakes.

3. In an air brake system a flexible train pipe connecting hose having an inner body portion normally airtight and an outer fabric portion permeable to air in a limited degree through the interstices of the fabric, the inner and outer portions being separated by a space into which the air escaping through the inner portion on a rupture thereof may spread laterally, thereby reducing the local disruptive strains on the outer portion, and means for limiting the lateral flow of air through said space said means comprising collars surrounding the inner body portion at intervals along the length of the hose, the permeability of the outer portion being so limited that the leakage through it on a rupture of the inner hose body will be insufficient to cause an emergency application of the brakes.

4. In an air brake system, a flexible train pipe connecting hose having an inner body portion normally airtight and an outer fabric portion permeable to air in a limited degree through the interstices of the fabric, the inner and outer portions being separated by a space into which the air escaping through the inner portion on a rupture thereof may spread laterally, thereby reducing the local disruptive strains on the outer portion, and means for limiting the lateral flow of air through said space, said means comprising collar portions integrally connecting the inner and outer portions of the hose at intervals along the length of the hose, the permeability of the outer portion being so limited that the leakage through it on a rupture of the inner hose body will be insufficient to cause an emergency application of the brakes.

5. An air hose having an inner body portion comprising a fabric and rubber shell B and rubber lining A vulcanized together and a fabric outer portion or tube C of limited permeability to the flow of air through its interstices, surrounding the tube B and separated from it by a space, and collars surrounding said body portion at intervals along the length of the tube and serving to divide said space into short tubular portions.

EDWARD D. NELSON.
WILLIAM L. BROWN.

Witnesses:
C. S. McIntyre,
H. H. Leader.